United States Patent
Beier et al.

[11] Patent Number: 5,661,906
[45] Date of Patent: Sep. 2, 1997

[54] METHOD OF WELDING COMB-SHAPED SEALING STRIPS TO PLATE HEAT EXCHANGERS

[75] Inventors: Albert Beier; Wolfgang Herrmann, both of Ratingen, Germany

[73] Assignee: BDAG Balcke-Dürr Aktiengesellschaft, Ratingen, Germany

[21] Appl. No.: 494,885

[22] Filed: Jun. 26, 1995

[30] Foreign Application Priority Data

Jun. 25, 1994 [DE] Germany ............... 44 22 283.1

[51] Int. Cl.⁶ ............................................. B23P 15/26
[52] U.S. Cl. ............................ 29/890.039; 29/890.054
[58] Field of Search .................. 29/890.03, 890.039, 29/890.054, 428; 228/183

[56] References Cited

U.S. PATENT DOCUMENTS

| | | | |
|---|---|---|---|
| 4,688,631 | 8/1987 | Peze et al. | 29/890.039 |
| 4,846,268 | 7/1989 | Beldam et al. | 29/890.039 |
| 4,915,163 | 4/1990 | Matsunaga et al. | 29/890.039 |
| 5,184,673 | 2/1993 | Hedman et al. | 29/890.039 |

FOREIGN PATENT DOCUMENTS

| | | |
|---|---|---|
| 0002986 | 7/1979 | European Pat. Off. . |
| 683125 | 12/1990 | Switzerland . |

*Primary Examiner*—Irene Cuda
*Attorney, Agent, or Firm*—Robert W. Becker & Associates

[57] ABSTRACT

In a method of manufacturing a plate heat exchanger individual plates are connected to pairs such that the individual plates are parallel to and spaced from one another by edge portions with a common edge. The pairs are combined to a plate stack such that the common edges are parallel. A sealing strip, having a slotted end face with parallel slots, is positioned at the end of the plate stack such that the common edges are received in the slots and the edge portions abut the slotted end face and such that the end of the plate stack projects slightly past the outer surface of the sealing strip perpendicular to the slotted end face. The sealing strip is welded to the common edges by using at least a portion of the material of the plate stack end projecting past the outer surface. The edge portions are welded to the outer surface of the sealing strip by using exclusively the material of the plate stack projecting past the outer surface. The welding heat is continuously dissipated by placing a shaped part, made of a material having good heat-conducting properties, onto the surface of the sealing strip opposite the outer surface.

3 Claims, 2 Drawing Sheets

METHOD OF WELDING COMB-SHAPED SEALING STRIPS TO PLATE HEAT EXCHANGERS

BACKGROUND OF THE INVENTION

The present invention relates to a method for welding comb-shaped sealing strips to plate heat exchangers for gasses guided in counter-flow, cross counter-flow or transverse flow, especially of cold clean gasses exiting a desulfurization device and of flue gasses for reheating these clean gasses resulting from the operation of a power plant fueled with fossil fuels, especially refuse incinerators.

Such plate heat exchangers are comprised of a plurality of pairs of plates, preferably made of highly corrosion-resistant material. The pairs, in turn, are connected to form a plate stack whereby, for separating the gas streams participating in the heat exchanging process, comb-shaped sealing strips are arranged at the edges as well as optionally at the center portion of the plate stacks.

Especially when highly corrosion-resistant material, for example, chromium molybdenum steels that have a high nickel contents, such as Hasteloy, is used as the material for the individual plates and the sealing strips, it is difficult to produce gas-tight welding seams of high corrosion resistance. It is also problematic that parts must be welded together that have a different wall thickness. While the individual plates have a sheet thickness of, for example, 0.37 mm, the wall thickness of the sealing strips is, for example, approximately 2.6 mm. Further complicating matters is the fact that the edges of these thin sheet metals must be welded to the wide side, i.e., the large surface of the sealing strip.

In the past the welding process of welding the comb-shaped sealing strips to the individual plates combined to plate pairs of the heat exchanger has been carried out by using a tungsten inert gas welding process whereby very thick welding seams are produced. Upon examining the welding seams produced in this manner, it has been proven time and time again that these welding seams are not gas-tight due to micropores. These micropores are caused by the extreme heat introduced during welding. Furthermore, it has been shown that the corrosion resistance of such welding seams is not sufficient with respect to the desired specifications even though highly corrosion resistant materials have been used not only for producing the individual plates and sealing strips, but also as the welding material. Tests have shown that the initially highly corrosion resistant welding material is subjected to a material change due to the extreme heat produced during welding and due to the burn-up during welding. This material change makes the starting material substantially more corrosion-sensitive.

It is therefore an object of the present invention to improve the aforementioned method of welding of comb-shaped sealing strips to plate heat exchangers such that even in a method for mass-production not only gas-tight but also highly corrosion-resistant welding seams can be produced.

SUMMARY OF THE INVENTION

The inventive method of manufacturing a plate heat exchanger is primarily characterized by the following steps:

Connecting individual plates to pairs such that the individual plates are parallel to and spaced from one another by edge portions with a common edge;

Combining the pairs to a plate stack such that the common edges are parallel to one another;

Positioning a comb-shaped sealing strip, having a slotted end face with parallel slots, at an end of the plate stack such that the common edges are received in the slots and the edge portions abut the slotted end face and such that the end of the plate stack projects slightly past an outer surface of the sealing strip which outer surface is perpendicular to the slotted end face;

Welding the sealing strip to the common edges by using at least a portion of the material of the end of the plate stack projecting past the outer surface of the sealing strip;

Welding the edge portions to the outer surface of the sealing strip by using exclusively the material of the end of the plate stack projecting past the outer surface of the sealing strip; and Dissipating continuously during both welding steps the heat resulting from welding by placing a shaped part, made of a material having good heat conducting properties, onto a surface of the sealing strip opposite the outer surface.

According to the present invention, the welding of the sealing strip to the parallel extending connected plate pairs having edges received in the slots of the sealing strip is carried out by using at least partially the material of the end of the plate stack projecting past the outer surface of the sealing strip. Furthermore, the edge portions of the plate pairs adjacent to the common edges, extending substantially along a common line and abutting at the slotted end face of the sealing strip, are welded without any additional welding material exclusively by using the plate material projecting past the outer surface of the sealing strip. Moreover, during welding a shaped part, comprised of a heat-conducting material, is placed onto the side of the sealing strip which is opposite the outer side so that the heat resulting from the welding process is constantly dissipated.

Due to the considerable reduction, respectively, decrease of additional welding material during the welding process and the continuous dissipation of heat resulting from the welding process, gas-tight welding seams with low welding seam cross-section are produced. It is advantageous in this context that the shaped part, resting at the surface of the sealing strip opposite the outer surface, have a spatial arrangement with only a minimal air gap relative to the components to be welded together and that this spatial arrangement be maintained during the entire welding process. Since no additional welding material is used, respectively, since the amount of welding material is considerably reduced for the welding operation, a negative effect on the corrosion resistance of the welding seams is avoided with the inventive process.

In order to improve, on the one hand, the heat dissipation and, on the other hand, the spatial arrangement of the components to be welded, according to a further feature of the invention it is possible to provide shaped members, made of a material with good heat conducting properties, that can be introduced into the intermediate spaces between neighboring individual plates of the plate pairs.

Furthermore, it is suggested with the present invention to provide the shaped part with bores for feeding forming gas to the welding seams. Due to this direct feeding of forming gas counter to the welding direction of the welding device, an effective improvement of the welding seam quality results.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 6.

Figure 2:
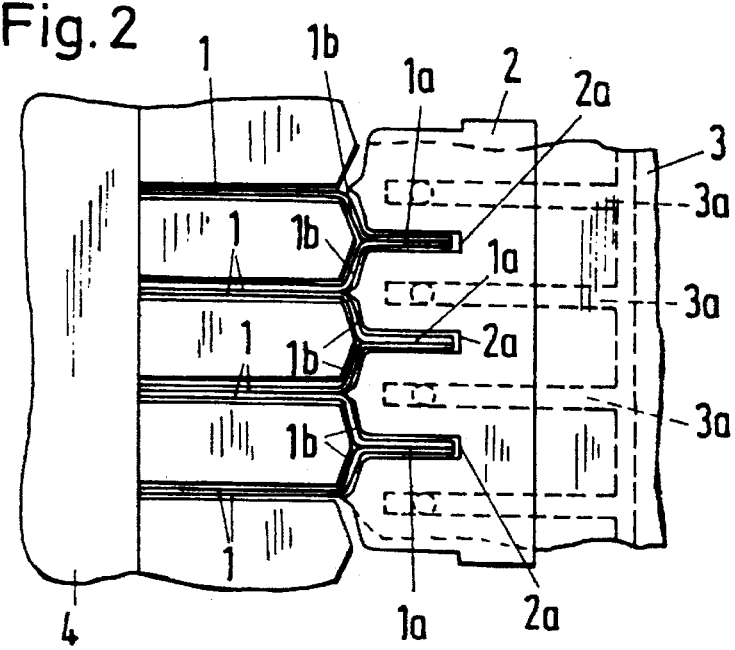
FIG. 2 shows a view of the representation of FIG. 1 rotated about 90°.
Figure 1:
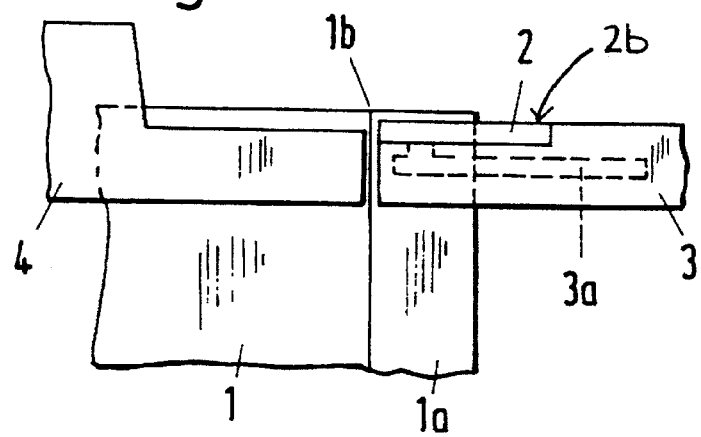
FIG. 1 shows a portion of the edge area of a plate heat exchanger which is produced from individual plates combined to plate pairs and to the edge of which a comb-shaped sealing strip is to be welded.

In FIGS. 1 and 2 edge parts of a total of three plate pairs are represented which have been manufactured from individual plates 1. The common edges 1a of these individual plates 1 are produced by twice bending the individual plates so that the ends of the plates abut and by welding together the abutting ends so that the aforementioned plate pairs result.

A sealing strip 2 is to be welded in a gas-tight manner to these common edges 1a and the edge portions 1b of the individual plates which extend between these common edges 1a. The sealing strip 2 according to FIG. 2 is provided at its end face with slots 2a for receiving the common edges 1a. Due to the slots 2a the sealing strip 2 is comb-shaped. The welding of this sealing strip 2 with respect to the common edges 1a as well as with respect to the edge portions 1b of the individual plates 1 is carried out at the respective ends of the individual plates, respectively, the plate stack as can be seen in FIG. 1. This representation shows that the ends of the common edges 1a as well as of the edge portions 1b project slightly past the outer surface 2b of the sealing strip 2.

Figure 3:
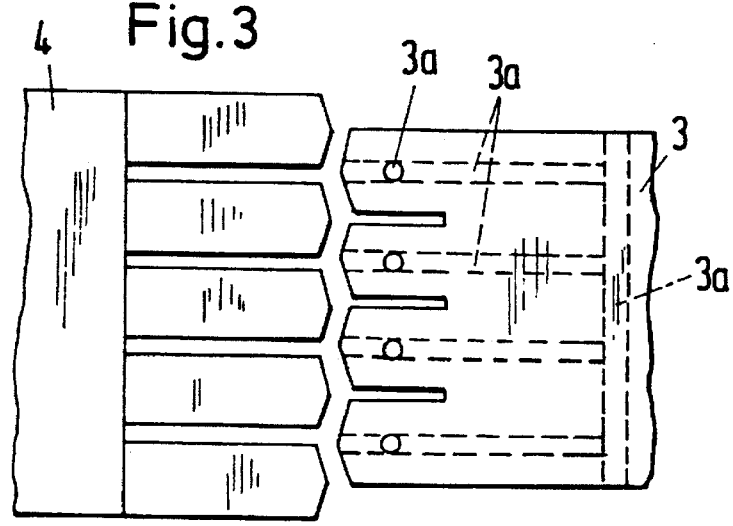
FIG. 3 shows a plan view corresponding to the view of FIG. 2 onto the shaped part used during welding.

In order to bring the sealing strip 2 into the correct position for welding while simultaneously reducing the air gap and in order to maintain the sealing strip 2 in this position, a shaped part 3 (or parts) is used that, according to FIG. 3, at its forward portion is also of a comb shape due to the presence of slots. The sealing strip 2 is inserted into the shaped part 3 as shown in FIG. 1. With the aid of this shaped part 3 the sealing strip 2 is maintained in its welding position relative to the individual plates 1. As a counter holder a shaped member (or members) 4 is provided that is introduced into the intermediate spaces between neighboring individual plates as can be seen in FIGS. 1 and 2. The shaped parts, respectively, members 3 and 4 are made of a material with good heat-conducting properties, for example, a copper alloy. The shaped part 3 in the embodiment shown is provided with bores 3a through which a forming gas can be supplied to the welding seam.

Figure 4:
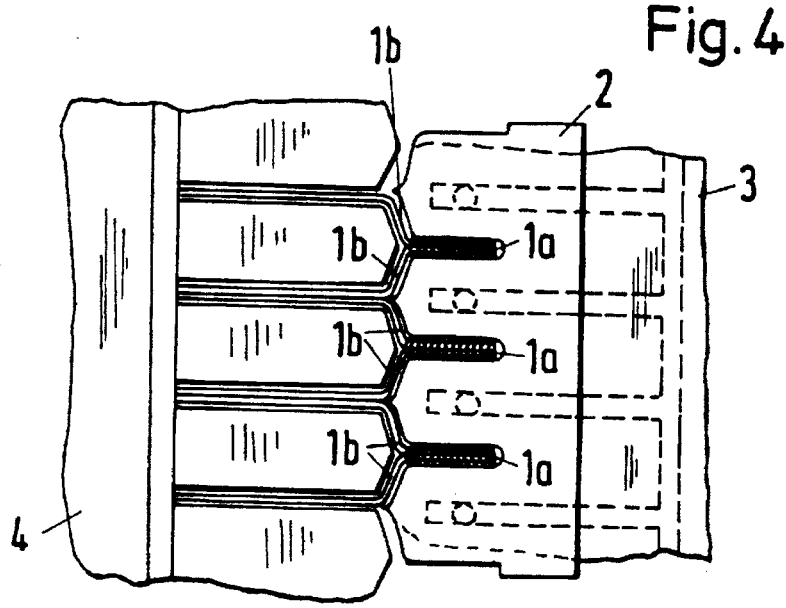
FIG. 4 shows a representation corresponding to FIG. 2 after welding of the common edges of the plate pairs positioned in the slots of the sealing strip.
Figure 6:
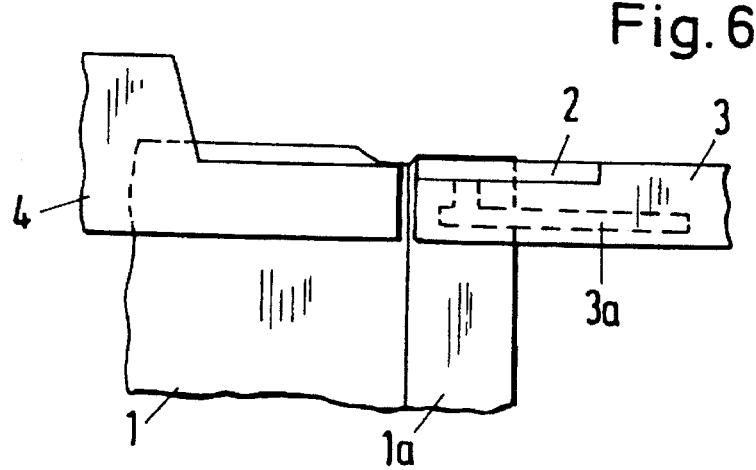
FIG. 6 shows in a representation corresponding to FIG. 1 the finished product after welding.

The welding of the ends of the common edges 1a of the individual plates 1 positioned in the slots 2a of the sealing strip 2 is carried out by using at least partially the material of the ends of the common edges 1a projecting past the outer surface 2b of the sealing strip 2, as is obvious when comparing FIGS. 6 and 1. This welding process is schematically represented in FIG. 4.

Figure 5:
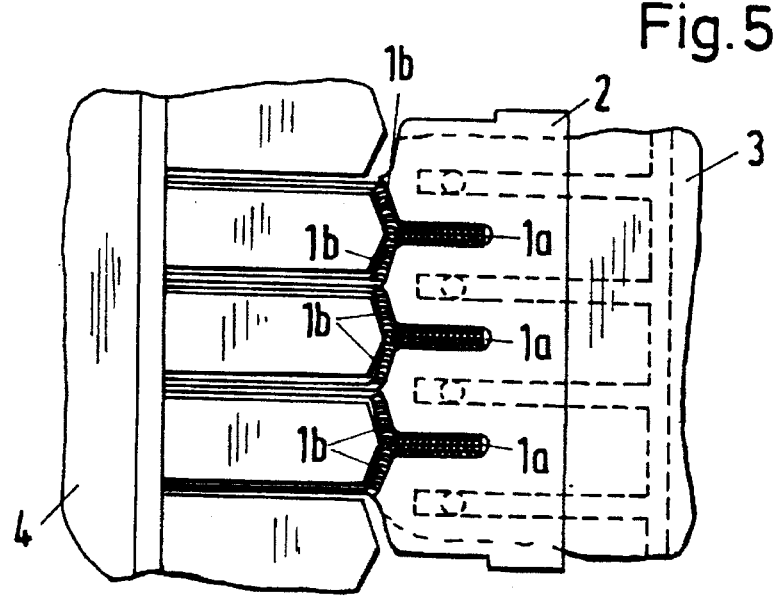
FIG. 5 shows in a representation corresponding to FIG. 4 after welding the edge portions of the plate pairs positioned at the slotted end face of the sealing strip.

The welding of the adjacent edge portions 1b of the individual plates 1 in the area of its ends with the outer surface 2b of the sealing strip 2 is carried out without any additional welding material by using exclusively the projecting plate material so that according to FIG. 5 very narrow welding seams of a small volume result.

During both welding processes the heat produced during welding is continuously dissipated by the shaped part 3 resting at the side of the sealing strip 2 opposite the outer side 2b and, on the other hand, by the shaped member 4 which abuts the edge portions 1b of the individual plates 1. This prevents overheating as well as the generation of burn-up. Thus, the production of micropores within the welding seams is prevented which would result in reduced gas-tightness, and, on the other hand, no material changes take place which would reduce the corrosion resistance of the welding seams.

The present invention is, of course, in no way restricted to the specific disclosure of the specification and drawings, but also encompasses any modifications within the scope of the appended claims.

What we claim is:

1. A method of manufacturing a plate heat exchanger, said method comprising the steps of:

connecting individual plates to pairs such that said individual plates are parallel to and spaced from one another by edge portions with a common edge;

combining said pairs to a plate stack such that said common edges are parallel to one another;

positioning a comb-shaped sealing strip, having a slotted end face with parallel slots, at an end of said plate stack such that said common edges are received in said slots and said edge portions abut said slotted end face and such that said end of said plate stack projects slightly past an outer surface of said sealing strip which outer surface is perpendicular to said slotted end face;

welding said sealing strip to said common edges by using at least a portion of a material of said end of said plate stack projecting past said outer surface of said sealing strip;

welding said edge portions to said outer surface of said sealing strip by using exclusively the material of said end of said plate stack projecting past said outer surface of said sealing strip; and dissipating continuously during both welding steps a heat resulting from welding by placing a shaped part, made of a material having good heat-conducting properties, onto a surface of said sealing strip opposite said outer surface.

2. A method according to claim 1, further comprising, before said steps of welding, the step of positioning shaped members of good heat-conducting properties between neighboring ones of said individual plates.

3. A method according to claim 1, further comprising the steps of providing bores in said shaped part and feeding forming gas to the welding seams through said bores.

* * * * *